US012764771B2

(12) United States Patent
Mu

(10) Patent No.: US 12,764,771 B2
(45) Date of Patent: Oct. 13, 2026

(54) DATA TRANSMISSION METHOD AND DATA TRANSMISSION APPARATUS

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 306 days.

(21) Appl. No.: 18/261,506

(22) PCT Filed: Jan. 18, 2021

(86) PCT No.: PCT/CN2021/072551

§ 371 (c)(1),
(2) Date: Jul. 14, 2023

(87) PCT Pub. No.: WO2022/151489

PCT Pub. Date: Jul. 21, 2022

(65) Prior Publication Data

US 2024/0389127 A1 Nov. 21, 2024

(51) Int. Cl.
*H04W 72/52* (2023.01)
*H04W 72/1273* (2023.01)
(Continued)

(52) U.S. Cl.
CPC ....... *H04W 72/52* (2023.01); *H04W 72/1273* (2013.01); *H04W 72/51* (2023.01); *H04W 72/566* (2023.01); *H04W 74/0833* (2013.01)

(58) Field of Classification Search
CPC . H04W 72/52; H04W 72/1273; H04W 72/51; H04W 72/566; H04W 74/0833; H04W 72/0457; H04W 28/20
See application file for complete search history.

(56) References Cited

U.S. PATENT DOCUMENTS 10,592,578 B1 * 3/2020 Mokashi ................ H04N 21/25
12,335,989 B2 * 6/2025 Ibrahim ............. H04B 7/06952
(Continued)

FOREIGN PATENT DOCUMENTS

CN 1878395 A 12/2006
CN 101076176 A 11/2007
(Continued)

OTHER PUBLICATIONS

Panasonic, Configuration of DL control resource set and UE bandwidth, 3GPP TSG-RAN WG1 NR AdHoc, R1-1700639, Jan. 16-20, 2017, Spokane, USA, 5 pages.
(Continued)

*Primary Examiner* — Ivan O Latorre
(74) *Attorney, Agent, or Firm* — Finnegan, Henderson, Farabow, Garrett & Dunner, L.L.P.

(57) ABSTRACT

A method for data transmission is performed by a terminal, and includes: determining, in response to a bandwidth required for a first quantity of information being greater than a transmission bandwidth corresponding to a terminal capability, to transmit a second quantity of information in the first quantity of information, and taking the second quantity of information as information for transmission; wherein the second quantity is less than the first quantity.

18 Claims, 3 Drawing Sheets

(51) Int. Cl.

| | |
|---|---|
| ***H04W 72/51*** | (2023.01) |
| ***H04W 72/566*** | (2023.01) |
| ***H04W 74/0833*** | (2024.01) |

(56) References Cited

U.S. PATENT DOCUMENTS

| | | | | |
|---|---|---|---|---|
| 2016/0112900 | A1* | 4/2016 | Bai | H04L 45/74 370/392 |
| 2018/0124409 | A1* | 5/2018 | Chen | H04L 65/612 |
| 2019/0116608 | A1 | 4/2019 | Kim et al. | |
| 2020/0228966 | A1 | 7/2020 | Xu et al. | |
| 2020/0328911 | A1* | 10/2020 | Zheng | H04L 49/90 |
| 2020/0366438 | A1 | 11/2020 | Rahman et al. | |
| 2022/0078768 | A1* | 3/2022 | El Hamss | H04L 1/1812 |
| 2022/0150173 | A1* | 5/2022 | Billuri | H04W 28/10 |
| 2022/0224649 | A1* | 7/2022 | Iyer | H04L 47/821 |
| 2023/0087902 | A1* | 3/2023 | Zheng | H04W 8/24 370/329 |
| 2024/0389127 | A1* | 11/2024 | Mu | H04W 72/1273 |
| 2024/0414703 | A1* | 12/2024 | Mu | H04W 72/0453 |
| 2024/0422066 | A1* | 12/2024 | Mu | H04W 74/0833 |
| 2025/0193866 | A1* | 6/2025 | Mu | H04W 72/0457 |

FOREIGN PATENT DOCUMENTS

| | | | |
|---|---|---|---|
| CN | 106165481 | A | 11/2016 |
| CN | 107251634 | A | 10/2017 |
| CN | 110945826 | A | 3/2020 |
| CN | 111567126 | A | 8/2020 |
| CN | 111836381 | A | 10/2020 |
| WO | WO 2014/205814 | A1 | 12/2014 |

OTHER PUBLICATIONS

International Search Report of International Application No. PCT/CN2021/072551, mailed Nov. 3, 2021, 4 pages.

Samsung, "RAN2 consideration for bandwith part in NR," 3GPP TSG-RAN WG2 NR Ad-hoc#2 Meeting, R2- 1706427, Qingdao, China, Jun. 27-29, 2017, 5 pages.

NTT Docomo, Inc., "Discussion on NR Rel-16 UE features," 3GPP TSG RAN WG1 #103-e, R1- 20008537, e-Meeting, Oct. 26-Nov. 13, 2020, 9 pages.

Asia Pacific Telecom, "Discussion on potential UE complexity reduction features," 3GPP TSG-RAN WG1 Meeting #101, R1-2004536, e-Meeting, May 25-Jun. 5, 2020, 3 pages.

Xiaomi, "Discussion on the complexity reduction for reduced capability," 3GPP TSG RAN WG1 #103-e, R1-2008857, e-Meeting, Oct. 26-Nov. 13, 2020, 9 pages.

European Patent Office, Extended European Search Report issued in Application No. 21918689.7 dated Jan. 4, 2024, 11 pages.

The First Office Action for Chinese Application No. 202180000239.7, dated Mar. 14, 2025, 13 pages.

Notification to Grant Patent Right for Invention for Chinese Application No. 202180000239.7, dated Jan. 9, 2026, 6 pages.

* cited by examiner

DATA TRANSMISSION METHOD AND DATA TRANSMISSION APPARATUS

CROSS REFERENCE TO RELATED APPLICATION

The present application is a U.S. National Stage of International Application No. PCT/CN2021/072551, filed on Jan. 18, 2021, the contents of which are incorporated herein by reference in their entireties.

TECHNICAL FIELD

The present disclosure relates to the technical field of wireless communications, and in particular, to a method for data transmission, an apparatus for data transmission, and a storage medium.

BACKGROUND

In a wireless communication system, Machine Type Communication (MTC) technology and Narrow Band Internet of Things (NB-IoT) technology are provided for low rate and high time delay scenarios of Internet of Things (IoT) services. Due to the development of the Internet of Things service, MTC technology and NB-IoT technology cannot meet the requirements of the current Internet of Things services on rate and time delay. Therefore, a new reduced capability (Redcap) terminal, which is referred to as NR-Lite, is designed to cover the service requirements of the Internet of Things.

In the related art, a bandwidth part (BWP) that is greater than the transceiving capability of the Redcap terminal may be configured for the Redcap terminal. The terminal transmits data in the BWP by frequency switching. However, when there is a plurality of pieces of data for transmission or processing in parallel in one BWP and the bandwidth required for the plurality of pieces of data for transmission or processing in parallel is greater than the bandwidth of the terminal capability, it cannot be determined how to process the plurality of pieces of data for transmission or processing in parallel.

SUMMARY

According to a first aspect of the embodiments of the present disclosure, there is provided a method for data transmission, performed by a terminal, and the method includes:

determining, in response to a bandwidth required for a first quantity of information being greater than a transmission bandwidth corresponding to a terminal capability, to transmit a second quantity of information in the first quantity of information, and taking the second quantity of information as information for transmission: where the second quantity is less than the first quantity.

According to a second aspect of the embodiments of the present disclosure, there is provided an apparatus for data transmission, including:

a processor; and a memory configured to store a processor-executable instruction, where the processor is configured to perform the method for data transmission according to the first aspect or any embodiment of the first aspect.

According to a third aspect of the embodiments of the present disclosure, there is provided a method for data transmission, and the method includes:

receiving, with a first bandwidth by a network device, a second quantity of information, where the first bandwidth is greater than a bandwidth corresponding to a terminal capability, a quantity of information corresponding to the first bandwidth is a first quantity of information, the first quantity is greater than the second quantity, and the second quantity of information is information with a high information priority in the first quantity of information.

According to a fourth aspect of the embodiments of the present disclosure, there is provided an apparatus for data transmission, including:

a processor; and a memory configured to store a processor-executable instruction, where the processor is configured to perform the method for data transmission according to the third aspect or any embodiment of the third aspect.

It should be understood that the above general description and the following detailed description are merely exemplary and explanatory, and cannot limit the present disclosure.

BRIEF DESCRIPTION OF THE DRAWINGS

The accompanying drawings, which are incorporated in and constitute a part of the description, illustrate embodiments consistent with the disclosure and together with the description serve to explain the principles of the disclosure.

DETAILED DESCRIPTION

Example embodiments will be described in detail here, which are illustrated in the accompanying drawings. When the following description refers to the accompanying drawings, unless otherwise indicated, the same numbers in different drawings represent the same or similar elements. The implementations described in the following example embodiments do not represent all implementations consistent with this disclosure. On the contrary, they are only examples of apparatuses and methods that are consistent with some aspects of the present disclosure as detailed in the attached claims.

Figure 1:
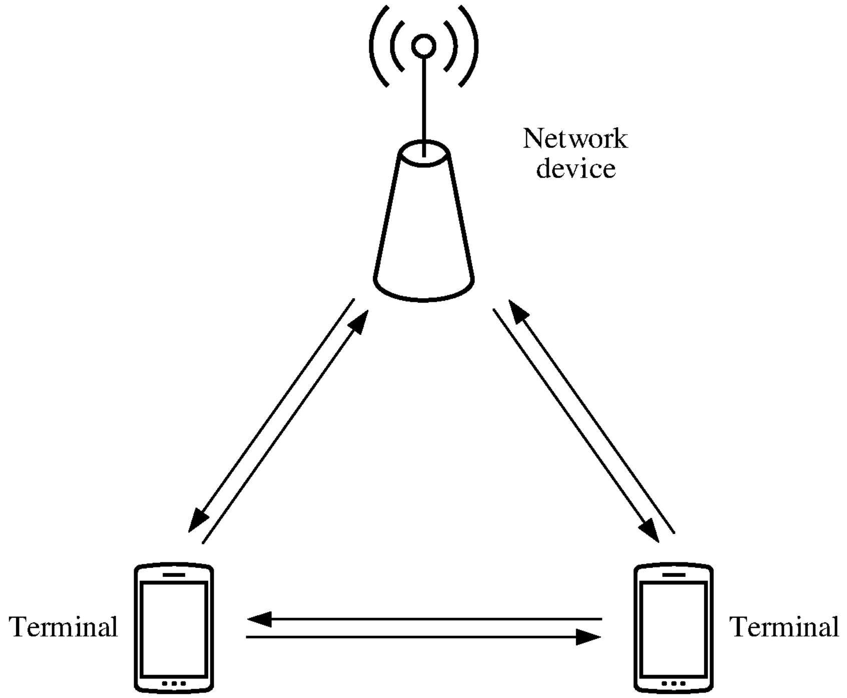
FIG. 1 is a diagram of a communication system architecture between a network device and a terminal according to some embodiments of the present disclosure.

FIG. 1 is a diagram of a communication system architecture between a network device and a terminal according to some embodiments of the present disclosure. The method for data transmission provided in the present disclosure may be applied to the communication system architecture shown in FIG. 1. As shown in FIG. 1, the network device may send signaling based on the architecture shown in FIG. 1.

It may be understood that the communication system between the network device and the terminal shown in FIG. 1 is merely illustrative. The wireless communication system may further include other network devices, for example, may further include a core network device, a wireless relay device, a wireless backhaul device, and the like, which is not shown in FIG. 1. In the embodiments of the present disclosure, the number of network devices and the number of terminals included in the wireless communication system are not limited.

It can be further understood that, the wireless communication system according to the embodiments of the present disclosure is a network for providing a wireless communication function. The wireless communication system may adopt different communication technologies, such as Code Division Multiple Access (CDMA), Wideband Code Division Multiple Access (WCDMA), Time Division Multiple Access (TDMA), Frequency Division Multiple Access (FDMA), Orthogonal Frequency-Division Multiple Access (OFDMA), Single Carrier FDMA (SC-FDMA), Carrier Sense Multiple Access with Collision Avoidance. According to the capacity, rate, time delay and other factors of different networks, the networks may be divided into 2G (Generation) networks, 3G networks, 4G networks, or future evolution networks, for example, 5G networks. The 5G network may also be referred to as a new radio (NR) network. For the convenience of description, a wireless communication network is also referred to as a network in the present disclosure.

Furthermore, the network device involved in the present disclosure may also be referred to as a wireless access network device. The wireless access network device may be an access point (AP), a wireless relay node, a wireless backhaul node, a transmission point (TP), or a transmission and reception point (TRP) in a base station, an evolved node B (a base station), a home base station, a wireless fidelity (WiFi) system, or may be a gNB in an NR system, or may also be a component or a part of devices that constitute a base station, etc. When the wireless communication system is a Vehicle to Everything (V2X) communication system, the network device may also be a vehicle-mounted device. It should be understood that, in the embodiments of the present disclosure, the specific technology and the specific device form used for the network device are not limited.

Furthermore, the terminal involved in the present disclosure may also be referred to as a terminal device, a user equipment (UE), a mobile station (MS), a mobile terminal (MT), and the like, which is a device for providing voice and/or data connectivity to a user. For example, the terminal may be a handheld device or a vehicle-mounted device having a wireless connection function, etc. Currently, some examples of the terminal include a mobile phone, a pocket personal computer (PPC), a palm computer, a personal digital assistant (PDA), a notebook computer, a tablet computer, a wearable device, or a vehicle-mounted device. In addition, when the wireless communication system is a Vehicle to Everything (V2X) communication system, the terminal device may also be a vehicle-mounted device. It should be understood that, in the embodiments of the present disclosure, the specific technology and the specific device form used for the terminal are not limited.

In a communication system such as an LTE (Long Term Evolution) system, a 4G (fourth-generation mobile communication technology) system, two technologies of MTC (Machine Type Communication) and NB-IoT (Narrow Band Internet of Things) are proposed for the Reduced capability UE in order to support the Internet of Things service, which mainly aims at scenes of low rate and high time delay, such as meter reading, environment monitoring and the like. Among them, the maximum transmission rate currently supported by the NB-IoT technology is several hundred kbps (thousands of bits per second), while the maximum transmission rate currently supported by the MTC technology is several Mbps (million bits per second). However, with the continuous development of Internet of Things service, for example, with the popularity of services such as video monitoring, smart home, wearable devices, industrial sensing monitoring and the like, the transmission rates usually required by these services are dozens of Mbps to 100 Mbps. Meanwhile, the foregoing services also have relatively higher requirements of time delay. Therefore, it is difficult for the MTC technology and the NB-IoT technology in LTE to meet the requirements of foregoing services. Based on this situation, it is started to redesign a new user equipment in 5G NR to cover the requirements of such a terminal IoT device. In current 3GPP (3rd Generation Partnership Project) standardization, this new terminal type is called a Reduced Capability (Redcap) terminal or referred to as a NR-Lite (a simplified version of new radio). The bandwidth configured for the Redcap terminal is relatively smaller. Therefore, for the Redcap terminal, since the bandwidth size is reduced, in the case of FR1, the bandwidth configured for the Redcap terminal is 20 MHZ; and in the case of FR2, the bandwidth configured for the Redcap terminal is 100 MHZ.

Based on this, the proposed solution is to determine a BWP for the terminal, where the bandwidth of the BWP exceeds the bandwidth required for its transceiving capability, and the terminal may transmit and receive data in a corresponding BWP greater than the terminal capability by frequency switching. However, there may be a plurality of pieces of information for transmission in the corresponding BWP greater than the terminal capability, for example, simultaneously receiving a physical downlink shared channel (PDSCH) and monitoring a physical downlink control channel (PDCCH), or simultaneously monitoring a plurality of control resource sets (CORESET) such as a common search space (CSS) and a UE specific search space (USS), or simultaneously performing measurement and data reception/PDCCH monitoring. However, when the terminal processes a plurality of pieces of information for transmission simultaneously, the required bandwidth is greater than the transmission bandwidth of the terminal capability, and at this time, the information for transmission cannot be determined, resulting in transmission failure.

Therefore, the present disclosure provides a method for data transmission. When the terminal processes a plurality pieces of information for transmission simultaneously, and the required bandwidth is greater than the transmission bandwidth of the terminal capability, the information for transmission is determined. The problem of transmission failure caused by bandwidth conflicts when a plurality pieces of information for transmission are processed simultaneously, is avoided.

Figure 2:
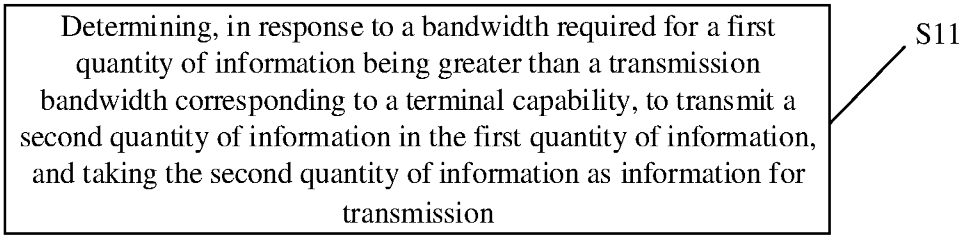
FIG. 2 is a flowchart of a method for data transmission according to some embodiments of the present disclosure.

FIG. 2 is a flowchart of a method for data transmission according to some embodiments of the present disclosure. As shown in FIG. 2, the method for data transmission is applied to a terminal, and includes the following steps.

In step S11, in response to a bandwidth required for a first quantity of information being greater than a transmission bandwidth corresponding to a terminal capability, it is determined to transmit a second quantity of information in the first quantity of information, and the second quantity of information is taken as information for transmission.

In some embodiments, the first quantity of information may be a first quantity of data, or a first quantity of signaling, or a first quantity of data and signaling.

In some embodiments of the present disclosure, the terminal determines that the bandwidth required for the first quantity of information for transmission simultaneously is greater than the transmission bandwidth corresponding to the terminal capability. The terminal determines to select, in the first quantity of information, the second quantity of information for transmission, and transmits the determined second quantity of information. Among them, in some embodiments of the present disclosure, the second quantity is less than the first quantity.

Figure 3:
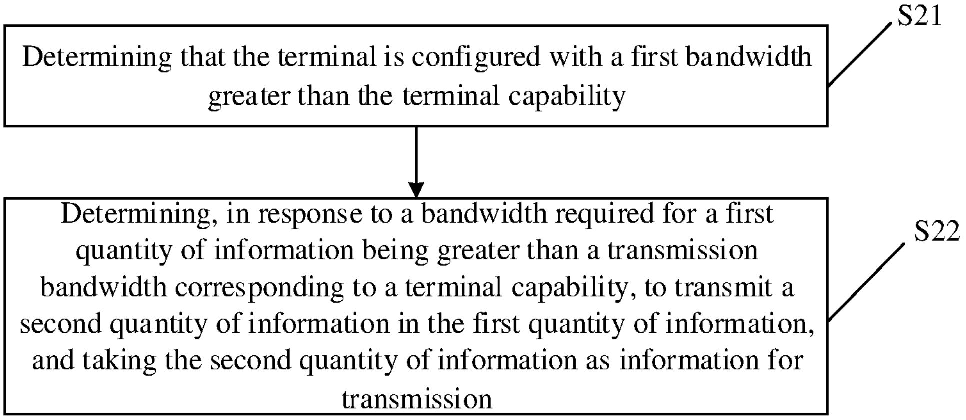
FIG. 3 is a flowchart of a method for data transmission according to some embodiments of the present disclosure.

FIG. 3 is a flowchart of a method for data transmission according to some embodiments of the present disclosure. As shown in FIG. 3, the method for data transmission includes the following steps.

In step S21, it is determined that the terminal is configured with a first bandwidth greater than the terminal capability.

In step S22, in response to the bandwidth required for the first quantity of information being greater than the transmission bandwidth corresponding to the terminal capability, it is determined to transmit the second quantity of information in the first quantity of information, and the second quantity of information is taken as information for transmission.

In some embodiments, the first quantity of information may be information to be transmitted.

In some embodiments, the first quantity of information may be a first quantity of data, or a first quantity of signaling, or a first quantity of data and signaling. In some embodiments, the second quantity of information, as the information for transmission, may be a second quantity of data, or a second quantity of signaling, or a second quantity of data and signaling.

In some embodiments of the present disclosure, the transmission bandwidth configured for the terminal by the network device is greater than the transmission bandwidth corresponding to the terminal capability, and the network device may transmit information based on a first BWP configured for the terminal and greater than the transmission bandwidth corresponding to the terminal capability. Among them, the information transmitted based on the first BWP may include at least one of the following: data, signaling for monitoring, measurement information, and the like. For example, the signaling for monitoring may be used for monitoring a PDCCH, monitoring a plurality of CORESETs, and the like, which not specifically limited here in the embodiments of the present disclosure.

Among them, the first BWP may include a plurality of BWPs, or may include one BWP. The plurality pieces of information are transmitted based on the first BWP, that is, a plurality pieces of information may be transmitted on one BWP or transmitted on a plurality of BWPs. In addition, for convenience of description, the bandwidth part configured for the terminal and greater than the terminal capability is referred to as the first BWP in the embodiments of the present disclosure.

In some embodiments of the present disclosure, the information for transmission includes at least one of the following:

data and/or signaling for sending;

data and/or signaling for receiving;

data and/or signaling for measuring; and data and/or signaling for monitoring.

Figure 4:
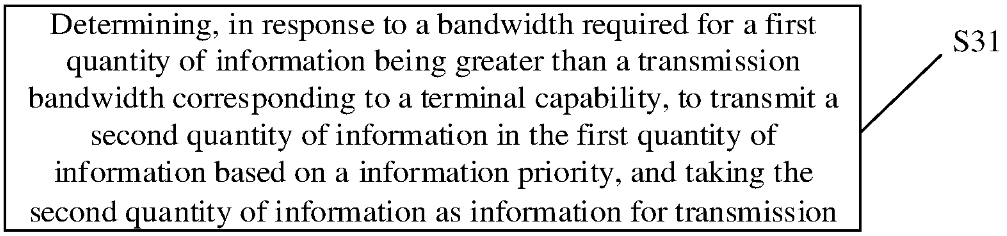
FIG. 4 is a flowchart of a method for data transmission according to some embodiments of the present disclosure.

FIG. 4 is a flowchart of a method for data transmission according to some embodiments of the present disclosure. As shown in FIG. 4, the method includes the following steps.

In step S31, in response to the bandwidth required for the first quantity of information being greater than the transmission bandwidth corresponding to the terminal capability, based on an information priority, it is determined to transmit the second quantity of information in the first quantity of information, and the second quantity of information is taken as the information for transmission In some embodiments of the present disclosure, for example, the information priority corresponding to each piece of information in the first quantity of information for transmission may be determined based on a predefined rule, it is determined to transmit the second quantity of information in the first quantity of information according to the determined information priority corresponding to each piece of information. Certainly, there are many ways to determine the priorities of different information included in the first quantity of information, which not limited in the embodiments of the present disclosure.

In some embodiments of the present disclosure, the method may further include: determining that the terminal is configured with a first bandwidth greater than the terminal capability.

In embodiments of the present disclosure, the following embodiments are described by taking information for downlink transmission as an example. Certainly, it should be noted that the following embodiments may be implemented separately and respectively, or may be implemented together, or a part of embodiments may be implemented together.

Figure 5:
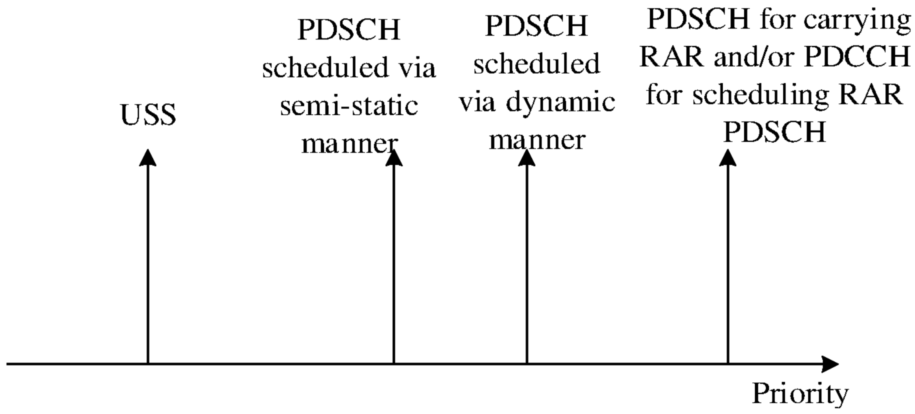
FIG. 5 is a schematic diagram of an information priority of downlink transmission in a method for data transmission according to some embodiments of the present disclosure.

FIG. 5 is a schematic diagram of an information priority of downlink transmission in a method for data transmission according to some embodiments of the present disclosure. As shown in FIG. 5:

In some embodiments of the present disclosure, the first quantity of information includes at least two kinds of information. According to the priorities of the different information, the second quantity of information is determined from the first quantity of information as the information for transmission. In some embodiments, high priority information may be preferentially transmitted, and then transmission of low priority information may be abandoned. In some embodiments, high priority information may be preferentially transmitted, and then low priority information may be transmitted. In some embodiments of the present disclosure, the first quantity of information includes a USS and a PDSCH scheduled via semi-static manner. In response to the information priority of the PDSCH scheduled via semi-static manner being higher than the information priority of the USS, it is determined to transmit the PDSCH scheduled via semi-static manner. Among them, the PDSCH scheduled via semi-static manner is scheduling information preset for downlink control signaling. In a subsequent preset scheduling occasion, no additional control signaling is needed, and the PDSCH may be directly transmitted according to the preset scheduling information.

In some embodiments of the present disclosure, the first quantity of information includes a USS and a PDSCH scheduled via dynamic manner.

In response to the information priority of the PDSCH scheduled via dynamic manner being higher than the information priority of the USS, it is determined to transmit the PDSCH scheduled via dynamic manner. The PDSCH scheduled via dynamic manner is scheduling information dynamically indicated by a physical downlink control channel (PDCCH) corresponding to the transmitted PDSCH.

In some embodiments of the present disclosure, the first quantity of information includes a UE specific search space (USS), and a PDSCH for carrying a random access response RAR and/or a PDCCH for scheduling an RAR PDSCH.

In response to the information priority of the PDSCH for carrying the RAR and/or the PDCCH for scheduling the RAR PDSCH being higher than the information priority of the USS, it is determined to transmit the PDSCH for carrying the RAR and/or the PDCCH for scheduling the RAR PDSCH.

In some embodiments of the present disclosure, the first quantity of information includes a PDSCH scheduled via semi-static manner and a PDSCH scheduled via dynamic manner.

In response to the information priority of the PDSCH scheduled via dynamic manner being higher than the information priority of the PDSCH scheduled via semi-static manner, it is determined to transmit the PDSCH scheduled via dynamic manner.

In some embodiments of the present disclosure, the first quantity of information includes a PDSCH scheduled via semi-static manner and a PDSCH for carrying an RAR and/or a PDCCH for scheduling an RAR PDSCH.

In response to the information priority of the PDSCH for carrying the RAR and/or the PDCCH for scheduling the RAR PDSCH being higher than the information priority of the PDSCH scheduled via semi-static manner, it is determined to transmit the PDSCH for carrying the RAR and/or the PDCCH for scheduling the RAR PDSCH.

In some embodiments of the present disclosure, the first quantity of information includes a PDSCH scheduled via dynamic manner and a PDSCH for carrying an RAR and/or a PDCCH for scheduling an RAR PDSCH.

In response to the information priority of the PDSCH for carrying the RAR and/or the PDCCH for scheduling the RAR PDSCH being higher than the information priority of the PDSCH scheduled via dynamic manner, it is determined to transmit the PDSCH for carrying the RAR and/or the PDCCH for scheduling the RAR PDSCH.

In some embodiments of the present disclosure, the first quantity of information includes a USS and a PDSCH scheduled via semi-static manner as well as a PDSCH scheduled via dynamic manner.

In response to the information priority of the PDSCH scheduled via dynamic manner being higher than the information priority of the PDSCH scheduled via semi-static manner, and the information priority of the PDSCH scheduled via semi-static manner being higher than the information priority of the USS, it is determined to transmit the PDSCH scheduled via dynamic manner, or it is determined to transmit the PDSCH scheduled via dynamic manner and the PDSCH scheduled via semi-static manner.

In some embodiments of the present disclosure, the first quantity of information includes a USS and a PDSCH scheduled via semi-static manner as well as a PDSCH for carrying an RAR and/or a PDCCH for scheduling an RAR PDSCH.

In response to the information priority of the PDSCH for carrying the RAR and/or the PDCCH for scheduling the RAR PDSCH being higher than the information priority of the PDSCH scheduled via semi-static manner, and the information priority of the PDSCH scheduled via semi-static manner being higher than the information priority of the USS, it is determined to transmit the PDSCH for carrying the RAR and/or the PDCCH for scheduling the RAR PDSCH, or it is determined to transmit the PDSCH for carrying the RAR and/or the PDCCH for scheduling the RAR PDSCH and the PDSCH scheduled via semi-static manner.

In some embodiments of the present disclosure, the first quantity of information includes a USS and a PDSCH scheduled via dynamic manner as well as a PDSCH for carrying an RAR and/or a PDCCH for scheduling an RAR PDSCH.

In response to the information priority of the PDSCH for carrying the RAR and/or the PDCCH for scheduling the RAR PDSCH being higher than the information priority of the PDSCH scheduled via dynamic manner, and the information priority of the PDSCH scheduled via dynamic manner being higher than the information priority of the USS, it is determined to transmit the PDSCH for carrying the RAR and/or the PDCCH for scheduling the RAR PDSCH, or it is determined to transmit the PDSCH for carrying the RAR and/or the PDCCH for scheduling the RAR PDSCH and the PDSCH scheduled via dynamic manner.

In some embodiments of the present disclosure, the first quantity of information includes a PDSCH scheduled via semi-static manner and a PDSCH scheduled via dynamic manner, as well as a PDSCH for carrying an RAR and/or a PDCCH for scheduling an RAR PDSCH.

In response to the information priority of the PDSCH for carrying the RAR and/or the PDCCH for scheduling the RAR PDSCH being higher than the information priority of the PDSCH scheduled via dynamic manner, and the information priority of the PDSCH scheduled via dynamic manner being higher than the information priority of the PDSCH scheduled via semi-static manner, it is determined to transmit the PDSCH for carrying the RAR and/or the PDCCH for scheduling the RAR PDSCH, or it is determined to transmit the PDSCH for carrying the RAR and/or the PDCCH for scheduling the RAR PDSCH and the PDSCH scheduled via dynamic manner.

In some embodiments of the present disclosure, the first quantity of information includes a USS, a PDSCH scheduled via semi-static manner, a PDSCH scheduled via dynamic manner, and a PDSCH for carrying the RAR and/or a PDCCH for scheduling an RAR PDSCH.

In response to the information priority of the PDSCH for carrying the RAR and/or the PDCCH for scheduling the RAR PDSCH being higher than the information priority of the PDSCH scheduled via dynamic manner, and the information priority of the PDSCH scheduled via dynamic manner being higher than the information priority of the PDSCH scheduled via semi-static manner, and the information priority of the PDSCH scheduled via semi-static manner being higher than the information priority of the USS, it is determined to transmit the PDSCH for carrying the RAR and/or the PDCCH for scheduling the RAR PDSCH, or it is determined to transmit the PDSCH for carrying the RAR and/or the PDCCH for scheduling the RAR PDSCH and the PDSCH scheduled via dynamic manner, or it is determined to transmit the PDSCH for carrying the RAR and/or the PDCCH for scheduling the RAR PDSCH and the PDSCH scheduled via dynamic manner as well as the PDSCH scheduled via semi-static manner.

In embodiments of the present disclosure, the following embodiments are described by taking information for uplink transmission as an example. Certainly, it should be noted that the following embodiments may be implemented separately and respectively, or may be implemented together, or a part of embodiments may be implemented together.

Figure 6:
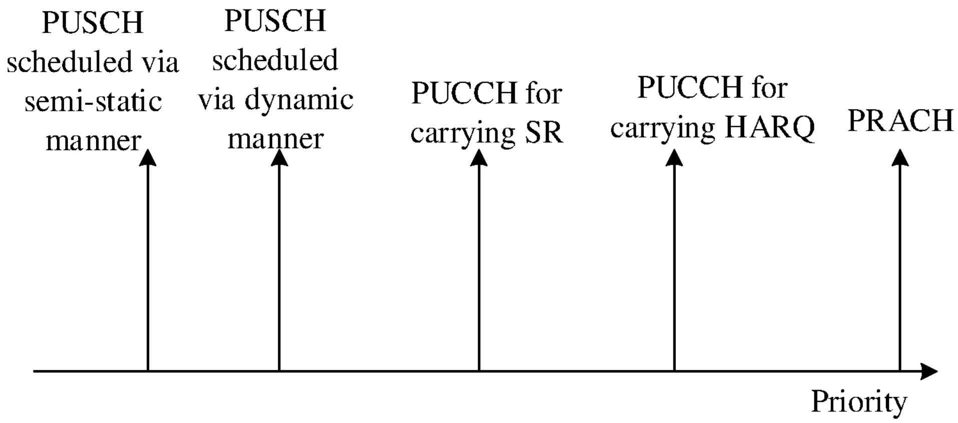
FIG. 6 is a schematic diagram of an information priority of uplink transmission in a method for data transmission according to some embodiments of the present disclosure.

FIG. 6 is a schematic diagram of an information priority of uplink transmission in a method for data transmission according to some embodiments of the present disclosure. As shown in FIG. 6:

In some embodiments of the present disclosure, the first quantity of information includes a physical uplink shared channel (PUSCH) scheduled via semi-static manner and a PUSCH scheduled via dynamic manner.

In response to the information priority of the PUSCH scheduled via dynamic manner g being higher than the information priority of the PUSCH scheduled via semi-static manner, it is determined to transmit the PUSCH scheduled via dynamic manner. The PUSCH scheduled via semi-static manner is scheduling information preset for uplink control signaling. The PUSCH scheduled via dynamic manner is scheduling information dynamically indicated by a physical uplink control channel (PUCCH) corresponding to the transmitted PUSCH.

In some embodiments of the present disclosure, the first quantity of information includes a PUSCH scheduled via semi-static manner and a PUCCH for carrying an uplink scheduling request (SR).

In response to the information priority of the PUCCH for carrying the SR being higher than the information priority of the PUSCH scheduled via semi-static manner, it is determined to transmit the PUCCH for carrying the SR.

In some embodiments of the present disclosure, the first quantity of information includes a PUSCH scheduled via semi-static manner and a PUCCH for carrying a hybrid automatic repeat request (HARQ).

In response to the information priority of the PUCCH for carrying the HARQ being higher than the information priority of the PUSCH scheduled via semi-static manner, it is determined to transmit the PUCCH for carrying the HARQ.

In some embodiments of the present disclosure, the first quantity of information includes a PUSCH scheduled via semi-static manner and a physical random access channel (PRACH).

In response to the information priority of the PRACH being higher than the information priority of the PUSCH scheduled via semi-static manner, it is determined to transmit the PRACH.

In some embodiments of the present disclosure, the first quantity of information includes a PUSCH scheduled via dynamic manner and a PUCCH for carrying an SR.

In response to the information priority of the PUCCH for carrying the SR being higher than the information priority of the PUSCH scheduled via dynamic manner, it is determined to transmit the PUCCH for carrying the SR.

In some embodiments of the present disclosure, the first quantity of information includes a PUSCH scheduled via dynamic manner and a PUCCH for carrying an HARQ.

In response to the information priority of the PUCCH for carrying the HARQ being higher than the information priority of the PUSCH scheduled via dynamic manner, it is determined to transmit the PUCCH for carrying the HARQ.

In some embodiments of the present disclosure, the first quantity of information includes a PUSCH scheduled via dynamic manner and a PRACH.

In response to the information priority of the PRACH being higher than the information priority of the PUSCH scheduled via dynamic manner, it is determined to transmit the PRACH.

In some embodiments of the present disclosure, the first quantity of information includes a PUCCH for carrying an SR and a PUCCH for carrying an HARQ.

In response to the information priority of the PUCCH for carrying the HARQ being higher than the information priority of the PUCCH for carrying the SR, it is determined to transmit the PUCCH for carrying the HARQ.

In some embodiments of the present disclosure, the first quantity of information includes a PUCCH for carrying an SR and a PRACHR.

In response to the information priority of the PRACH being higher than the information priority of the PUCCH for carrying the SR, it is determined to transmit the PRACH for carrying.

In some embodiments of the present disclosure, the first quantity of information includes a PUCCH for carrying an HARQ and a PRACH.

In response to the information priority of the PRACH being higher than the information priority of the PUCCH for carrying the HARQ, it is determined to transmit the PRACH for carrying.

In some embodiments of the present disclosure, the first quantity of information includes a PUSCH scheduled via semi-static manner and a PUSCH scheduled via dynamic manner as well as a PUCCH for carrying an SR.

In response to the information priority of the PUCCH for carrying the SR being higher than the information priority of the PUSCH scheduled via dynamic manner, and the information priority of the PUSCH scheduled via dynamic manner being higher than the information priority of the PUSCH scheduled via semi-static manner, it is determined to transmit the PUCCH for carrying the SR, or it is determined to transmit the PUCCH for carrying the SR and the PUSCH scheduled via dynamic manner.

In some embodiments of the present disclosure, the first quantity of information includes a PUSCH scheduled via semi-static manner, and a PUSCH scheduled via dynamic manner as well as a PUCCH for carrying an HARQ.

In response to the information priority of the PUCCH for carrying the HARQ being higher than the information priority of the PUSCH scheduled via dynamic manner, and the information priority of the PUSCH scheduled via dynamic manner being higher than the information priority of the PUSCH scheduled via semi-static manner, it is determined to transmit the PUCCH for carrying the HARQ, or it is determined to transmit the PUCCH for carrying the HARQ and the PUSCH scheduled via dynamic manner.

In some embodiments of the present disclosure, the first quantity of information includes a PUSCH scheduled via semi-static manner and a PUSCH scheduled via dynamic manner as well as a PRACH.

In response to the information priority of the PRACH being higher than the information priority of the PUSCH scheduled via dynamic manner, and the information priority of the PUSCH scheduled via dynamic manner being higher than the information priority of the PUSCH scheduled via semi-static manner, it is determined to transmit the PRACH, or it is determined to transmit the PRACH and the PUSCH scheduled via dynamic manner.

In some embodiments of the present disclosure, the first quantity of information includes a PUSCH scheduled via semi-static manner and a PUCCH for carrying an SR as well as a PUCCH for carrying an HARQ.

In response to the information priority of the PUCCH for carrying the HARQ being higher than the information priority of the PUCCH for carrying the SR, and the information priority of the PUCCH for carrying the SR being higher than the information priority of the PUSCH scheduled via semi-static manner, it is determined to transmit the PUCCH for carrying the HARQ, or it is determined to transmit the PUCCH for carrying the HARQ and the PUCCH for carrying the SR.

In some embodiments of the present disclosure, the first quantity of information includes a PUSCH scheduled via semi-static manner and a PUCCH for carrying an SR as well as a PRACH.

In response to the information priority of the PRACH being higher than the information priority of the PUCCH for carrying the SR, and the information priority of the PUCCH for carrying the SR being higher than the information priority of the PUSCH scheduled via semi-static manner, it is determined to transmit the PRACH, or it is determined to transmit the PRACH and the PUCCH for carrying the SR.

In some embodiments of the present disclosure, the first quantity of information includes a PUSCH scheduled via semi-static manner and a PUCCH for carrying an HARQ and a PRACH;

In response to the information priority of the PRACH being higher than the information priority of the PUCCH for carrying the HARQ, and the information priority of the PUCCH for carrying the HARQ being higher than the information priority of the PUSCH scheduled via semi-static manner, it is determined to transmit the PRACH, or it is determined to transmit the PRACH and the PUCCH for carrying the HARQ.

In some embodiments of the present disclosure, the first quantity of information includes a PUSCH scheduled via dynamic manner and a PUCCH for carrying an SR as well as a PUCCH for carrying an HARQ.

In response to the information priority of the PUCCH for carrying the HARQ being higher than the information priority of the PUCCH for carrying the SR, and the information priority of the PUCCH for carrying the SR being higher than the information priority of the PUSCH scheduled via dynamic manner, it is determined to transmit the PUCCH for carrying the HARQ, or it is determined to transmit the PUCCH for carrying the HARQ and the PUCCH for carrying the SR.

In some embodiments of the present disclosure, the first quantity of information includes a PUSCH scheduled via dynamic manner and a PUCCH for carrying an HARQ as well as a PRACH.

In response to the information priority of the PRACH being higher than the information priority of the PUCCH for carrying the HARQ, and the information priority of the PUCCH for carrying the HARQ being higher than the information priority of the PUSCH scheduled via dynamic manner, it is determined to transmit the PRACH, or it is determined to transmit the PRACH and the PUCCH for carrying the HARQ.

In some embodiments of the present disclosure, the first quantity of information includes a PUCCH for carrying an SR and a PUCCH for carrying an HARQ as well as a PRACH.

In response to the information priority of the PRACH being higher than the information priority of the PUCCH for carrying the HARQ, and the information priority of the PUCCH for carrying the HARQ being higher than the information priority of the PUCCH for carrying the SR, it is determined to transmit the PRACH, or it is determined to transmit the PRACH and the PUCCH for carrying the HARQ.

In some embodiments of the present disclosure, the first quantity of information includes a PUSCH scheduled via semi-static manner, a PUCCH for carrying an SR, a PUCCH for carrying an HARQ, and a PRACH.

In response to the information priority of the PRACH being higher than the information priority of the PUCCH for carrying the HARQ, and the information priority of the PUCCH for carrying the HARQ being higher than the information priority of the PUCCH for carrying the SR, and the information priority of the PUCCH for carrying the SR being higher than the information priority of the PUSCH scheduled via semi-static manner, it is determined to transmit the PRACH, or it is determined to transmit the PRACH and the PUCCH for carrying the HARQ, or it is determined to transmit the PRACH and the PUCCH for carrying the HARQ as well as the PUCCH for carrying the SR.

In some embodiments of the present disclosure, the first quantity of information includes a PDSCH scheduled via dynamic manner, a PUCCH for carrying an SR, a PUCCH for carrying an HARQ, and a PRACH.

In response to the information priority of the PRACH being higher than the information priority of the PUCCH for carrying the HARQ, and the information priority of the PUCCH for carrying the HARQ being higher than the information priority of the PUCCH for carrying the SR, and the information priority of the PUCCH for carrying the SR being higher than the information priority of the PUSCH scheduled via dynamic manner, it is determined to transmit the PRACH, or it is determined to transmit the PRACH and the PUCCH for carrying the HARQ, or it is determined to transmit the PRACH and the PUCCH for carrying the HARQ as well as the PUCCH for carrying the SR.

In some embodiments of the present disclosure, the first quantity of information includes a PUSCH scheduled via semi-static manner, a PUSCH scheduled via dynamic manner, a PUCCH for carrying an HARQ, and a PRACH.

In response to the information priority of the PRACH being higher than the information priority of the PUCCH for carrying the HARQ, and the information priority of the PUCCH for carrying the HARQ being higher than the information priority of the PUSCH scheduled via dynamic manner, and the information priority of the PUSCH scheduled via dynamic manner being higher than the information priority of the PUSCH scheduled via semi-static manner, it is determined to transmit the PRACH, or it is determined to transmit the PRACH and the PUCCH for carrying the HARQ, or it is determined to transmit the PRACH and the PUCCH for carrying the HARQ as well as the PUSCH scheduled via dynamic manner.

In some embodiments of the present disclosure, the first quantity of information includes a PUSCH scheduled via semi-static manner, a PUSCH scheduled via dynamic manner, a PUCCH for carrying an SR, and a PRACH.

In response to the information priority of the PRACH being higher than the PUCCH for carrying the SR, and the information priority of the PUCCH for carrying the SR being higher than the PUSCH scheduled via dynamic manner, and the information priority of the PUSCH scheduled via dynamic manner being higher than the information priority of the PUSCH scheduled via semi-static manner, it is determined to transmit the PRACH, or it is determined to transmit the PRACH and the PUCCH for carrying the SR, or it is determined to transmit the PRACH and the PUCCH for carrying the SR as well as the PUSCH scheduled via dynamic manner.

In some embodiments of the present disclosure, the first quantity of information includes a PUSCH scheduled via semi-static manner, a PUSCH scheduled via dynamic manner, a PUCCH for carrying an SR, and a PUCCH for carrying an HARQ.

In response to the information priority of the PUCCH for carrying the HARQ being higher than the PUCCH for carrying the SR, and the information priority of the PUCCH for carrying the SR being higher than the PUSCH scheduled via dynamic manner, and the information priority of the PUSCH scheduled via dynamic manner being higher than the information priority of the PUSCH scheduled via semi-static manner, it is determined to transmit the PUCCH for carrying the HARQ, or it is determined to transmit the PUCCH for carrying the HARQ and the PUCCH for carrying the SR, or it is determined to transmit the PUCCH for carrying the HARQ and the PUCCH for carrying the SR as well as the PUSCH scheduled via dynamic manner.

In some embodiments of the present disclosure, the first quantity of information includes a PUSCH scheduled via semi-static manner, a PUSCH scheduled via dynamic manner, a PUCCH for carrying an SR, a PUCCH for carrying an HARQ, and a PRACH.

In response to the information priority of the PRACH being higher than the information priority of the PUCCH for carrying the HARQ, and the information priority of the PUCCH for carrying the HARQ being higher than the information priority of the PUSCH for carrying the SR, and the information priority of the PUCCH for carrying the SR being higher than the PUSCH scheduled via dynamic manner, and the information priority of the PDSCH scheduled via dynamic manner being higher than the information priority of the PUSCH scheduled via semi-static manner, it is determined to transmit the PRACH, or it is determined to transmit the PRACH and the PUCCH for carrying the HARQ, or it is determined to transmit the PRACH and the PUCCH for carrying the HARQ as well as the PUCCH for carrying the SR, or it is determined to transmit the PRACH and the PUCCH for carrying the HARQ and the PUCCH for carrying the SR as well as the PUSCH scheduled via dynamic manner.

Based on the same concept, embodiments of the present disclosure further provide an apparatus for data transmission.

It may be understood that, in order to implement the foregoing functions, the apparatus for data transmission provided in the embodiments of the present disclosure includes corresponding hardware structures and/or software modules for performing each function. With reference to the units and algorithm steps of the examples disclosed in the embodiments of the present disclosure, the embodiments of the present disclosure can be implemented in the form of hardware or a combination of hardware and computer software. Whether a function is performed by hardware or computer software driving hardware depends on the specific application and design constraint conditions of the technical solution. Those skilled in the art may use different methods to implement the described functions for each specific application, but it should not be considered that the implementation goes beyond the scope of the technical solutions of the embodiments of the present disclosure.

Figure 7:
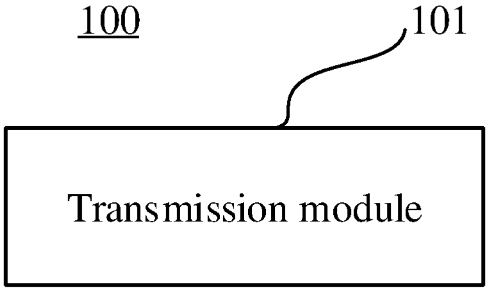
FIG. 7 is a block diagram of an apparatus for data transmission according to some embodiments of the present disclosure.

FIG. 7 is a block diagram of an apparatus for data transmission according to some embodiments of the present disclosure. Referring to FIG. 7, the apparatus 100 for data transmission includes a transmission module 101.

The transmission module 101 is configured to determine, in response to a bandwidth required for a first quantity of information being greater than a transmission bandwidth corresponding to a terminal capability, to transmit a second quantity of information in the first quantity of information, and take the second quantity of information as information for transmission, where the second quantity is less than the first quantity.

In some embodiments, the first quantity of information may be information to be transmitted.

In some embodiments, the first quantity of information may be a first quantity of data, or a first quantity of signaling, or a first quantity of data and signaling. In some embodiments, the second quantity of information, as the information for transmission, may be a second quantity of data, or a second quantity of signaling, or a second quantity of data and signaling.

In some embodiments of the present disclosure, the first quantity of information includes at least two kinds of information. According to the priorities of the different information, the second quantity of information is determined as the information for transmission. In some embodiments, high priority information may be preferentially transmitted, and then transmission of low priority information is abandoned. In some embodiments, high priority information may be preferentially transmitted, and then low priority information is transmitted.

In some embodiments of the present disclosure, the transmission module 101 is further configured to determine that the terminal is configured with a first bandwidth greater than the terminal capability, and transmit the first quantity of information based on the first bandwidth.

In some embodiments of the present disclosure, the information for transmission includes at least one of the following:

sending data and/or signaling, receiving data and/or signaling, measuring data and/or signaling, and monitoring data and/or signaling.

In some embodiments of the present disclosure, the transmission module 101 is configured to determine to transmit the second quantity of information in the first quantity of information based on a predefined information priority.

In some embodiments of the present disclosure, the first quantity of information includes a UE specific search space (USS) and a physical downlink shared channel (PDSCH) scheduled via semi-static manner.

The transmission module 101 is configured to determine, in response to the information priority of the PDSCH scheduled via semi-static manner being higher than the information priority of the USS, to transmit the PDSCH scheduled via semi-static manner. The PDSCH scheduled via semi-static manner is scheduling information preset for downlink control signaling.

In some embodiments of the present disclosure, the first quantity of information includes a USS and a PDSCH scheduled via dynamic manner.

The transmission module 101 is configured to determine, in response to the information priority of the PDSCH scheduled via dynamic manner being higher than the information priority of the USS, to transmit the PDSCH scheduled via dynamic manner. The PDSCH scheduled via dynamic manner is scheduling information dynamically indicated by a physical downlink control channel (PDCCH) corresponding to the transmitted PDSCH.

In some embodiments of the present disclosure, the first quantity of information includes a UE specific search space (USS), and a PDSCH for carrying a random access response (RAR) and/or a PDCCH for scheduling an RAR PDSCH.

The transmission module 101 is configured to determine, in response to the information priority of the PDSCH for carrying the RAR and/or the PDCCH for scheduling the RAR PDSCH being higher than the information priority of the USS, to transmit the PDSCH for carrying the RAR and/or the PDCCH for scheduling the RAR PDSCH.

In some embodiments of the present disclosure, the first quantity of information includes a PDSCH scheduled via semi-static manner and a PDSCH scheduled via dynamic manner.

The transmission module 101 is configured to determine, in response to the information priority of the PDSCH scheduled via dynamic manner being higher than the information priority of the PDSCH scheduled via semi-static manner, to transmit the PDSCH scheduled via dynamic manner.

In some embodiments of the present disclosure, the first quantity of information includes a PDSCH scheduled via semi-static manner and a PDSCH for carrying an RAR and/or a PDCCH for scheduling an RAR PDSCH.

The transmission module 101 is configured to determine, in response to the information priority of the PDSCH for carrying the RAR and/or the PDCCH for scheduling the RAR PDSCH being higher than the information priority of the PDSCH scheduled via semi-static manner, to transmit the PDSCH for carrying the RAR and/or the PDCCH for scheduling the RAR PDSCH.

In some embodiments of the present disclosure, the first quantity of information includes a PDSCH scheduled via dynamic manner and a PDSCH for carrying an RAR and/or a PDCCH for scheduling an RAR PDSCH.

The transmission module 101 is configured to determine, in response to the information priority of the PDSCH for carrying the RAR and/or the PDCCH for scheduling the RAR PDSCH being higher than the information priority of the PDSCH scheduled via dynamic manner, to transmit the PDSCH for carrying the RAR and/or the PDCCH for scheduling the RAR PDSCH.

In some embodiments of the present disclosure, the first quantity of information includes a physical uplink shared channel (PUSCH) scheduled via semi-static manner and a PUSCH scheduled via dynamic manner.

The transmission module 101 is configured to determine, in response to the information priority of the PUSCH scheduled via dynamic manner being higher than the information priority of the PUSCH scheduled via semi-static manner, to transmit the PUSCH scheduled via dynamic manner. The PUSCH scheduled via semi-static manner is scheduling information preset for downlink control signaling. The PUSCH scheduled via dynamic manner is scheduling information dynamically indicated by a physical uplink control channel (PUCCH) corresponding to the transmitted PUSCH.

In some embodiments of the present disclosure, the first quantity of information includes a PUSCH scheduled via semi-static manner and a PUCCH for carrying an uplink scheduling request (SR).

The transmission module 101 is configured to determine, in response to the information priority of the PUCCH for carrying the SR being higher than the information priority of the PUSCH scheduled via semi-static manner, to transmit the PUCCH for carrying the SR.

In some embodiments of the present disclosure, the first quantity of information includes a PUSCH scheduled via semi-static manner and a PUCCH for carrying a hybrid automatic repeat request (HARQ).

The transmission module 101 is configured to determine, in response to the information priority of the PUCCH for carrying the HARQ being higher than the information priority of the PUSCH scheduled via semi-static manner, to transmit the PUCCH for carrying the HARQ.

In some embodiments of the present disclosure, the first quantity of information includes a PUSCH scheduled via semi-static manner and a physical random access channel (PRACH).

The transmission module 101 is configured to determine, in response to the information priority of the PRACH being higher than the information priority of the PUSCH scheduled via semi-static manner, to transmit the PRACH.

In some embodiments of the present disclosure, the first quantity of information includes a PUSCH scheduled via dynamic manner and a PUCCH for carrying an SR.

The transmission module 101 is configured to determine, in response to the information priority of the PUCCH for carrying the SR being higher than the information priority of the PUSCH scheduled via dynamic manner, to transmit the PUCCH for carrying the SR.

In some embodiments of the present disclosure, the first quantity of information includes a PUSCH scheduled via dynamic manner and a PUCCH for carrying an HARQ.

The transmission module 101 is configured to determine, in response to the information priority of the PUCCH for carrying the HARQ being higher than the information priority of the PUSCH scheduled via dynamic manner, to transmit the PUCCH for carrying the HARQ.

In some embodiments of the present disclosure, the first quantity of information includes a PUSCH scheduled via dynamic manner and a PRACH.

The transmission module 101 is configured to determine, in response to the information priority of the PRACH being higher than the information priority of the PUSCH scheduled via dynamic manner, to transmit the PRACH.

In some embodiments of the present disclosure, the first quantity of information includes a PUCCH for carrying an SR and a PUCCH for carrying an HARQ.

The transmission module 101 is configured to determine, in response to the information priority of the PUCCH for carrying the HARQ being higher than the information priority of the PUCCH for carrying the SR, to transmit the PUCCH for carrying the HARQ.

In some embodiments of the present disclosure, the first quantity of information includes a PUCCH for carrying an SR and a PRACH.

The transmission module 101 is configured to determine, in response to the information priority of the PRACH being higher than the information priority of the PUCCH for carrying the SR, to transmit the PRACH.

In some embodiments of the present disclosure, the first quantity of information includes a PUCCH for carrying an HARQ and a PRACH.

The transmission module 101 is configured to determine, in response to the information priority of the PRACH being higher than the information priority of the PUCCH for carrying the HARQ, to transmit the PRACH.

With regard to the apparatus in the above embodiments, the specific manner in which each module performs an operation has been described in detail in the embodiments related to the method, and will not be described in detail here.

Figure 8:
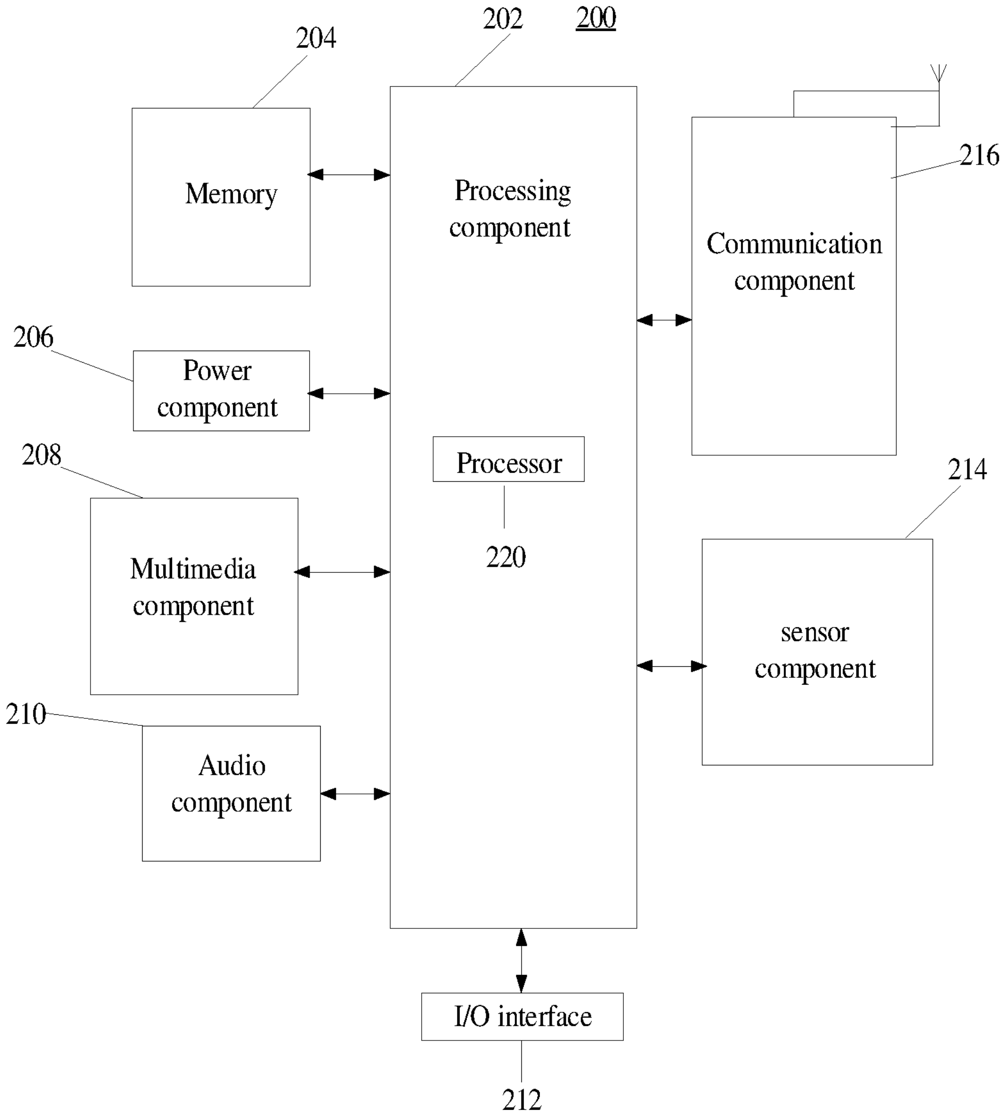
FIG. 8 is a block diagram of an apparatus for data transmission according to some embodiments of the present disclosure.

FIG. 8 is a block diagram of an apparatus 200 for data transmission according to some embodiments of the present disclosure. For example, the apparatus 200 may be a mobile phone, a computer, a digital broadcast terminal, a device for sending and receiving message, a game console, a tablet device, a medical device, a fitness device, a personal digital assistant, etc.

Referring to FIG. 8, the apparatus 200 may include one or more of the following components: a processing component 202, a memory 204, a power component 206, a multimedia component 208, an audio component 210, an input/output (I/O) interface 212, a sensor component 214, and a communication component 216

The processing component 202 generally controls the overall operation of the apparatus 200, such as operations associated with display, telephone calls, data communications, camera operations, and recording operations. The processing component 202 may include one or more processors 220 to execute instructions to complete all or part of the steps of the methods described above. In addition, the processing component 202 may include one or more modules that facilitate interaction between the processing component 202 and other components. For example, the processing component 202 may include a multimedia module to facilitate interaction between the multimedia component 208 and the processing component 202.

The memory 204 is configured to store various types of data to support operation at the apparatus 200. Examples of such data include instructions for any application or method operating on apparatus 200, contact data, phonebook data, messages, pictures, videos, and the like. The memory 204 may be implemented by any type of volatile or non-volatile storage device or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 206 provides electrical power to various components of the apparatus 200. The power component 206 may include a power management system, one or more power sources, and other components associated with generating, managing, and distributing power for apparatus 200.

The multimedia component 208 includes a screen providing an output interface between the apparatus 200 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touches, sliding, and gestures on the touch panel. The touch sensor may not only sense a boundary of a touch or sliding action, but also detect a duration and pressure associated with the touch or sliding operation. In some embodiments, the multimedia component 208 includes a front-facing camera and/or a rear-facing camera. When the apparatus 200 is in an operation mode, such as a photographing mode or a video mode, the front-facing camera and/or the rear-facing camera may receive external multimedia data. Each of the front-facing camera and/or the rear-facing camera may be a fixed optical lens system or have a focal length and an optical zoom capability.

The audio component 210 is configured to output and/or input an audio signal. For example, the audio component 210 includes a microphone (MIC), which is configured to receive an external audio signal when the apparatus 200 is in an operating mode, such as a call mode, a recording mode, and a speech recognition mode. The received audio signal may be further stored in the memory 204 or transmitted via the communication component 216. In some embodiments, the audio component 210 further includes a speaker configured to output an audio signal.

The I/O interface 212 provides an interface between the processing component 202 and a peripheral interface module, and the peripheral interface module may be a keyboard, a click wheel, a button, or the like. The button may include, but are not limited to, a home button, a volume button, a start button, and a lock button.

The sensor component 214 includes one or more sensors for providing status assessments of various aspects for the apparatus 200. For example, the sensor component 214 may detect the open/closed state of the apparatus 200, and the relative positioning of the components that are the display and the keypad of the apparatus 200 for example. The sensor component 214 may also detect a change in the position of the apparatus 200 or a component of the apparatus 200, the presence or absence of contact between the user and the apparatus 200, the orientation or acceleration/deceleration of the apparatus 200, and the temperature change of the apparatus 200. The sensor component 214 may include a proximity sensor configured to detect the presence of nearby objects without any physical contact. The sensor component 214 may also include a light sensor, such as a CMOS or CCD image sensor, for use in an imaging application. In some embodiments, the sensor component 214 may further include an acceleration sensor, a gyroscope sensor, a magnetic sensor, a pressure sensor, or a temperature sensor.

The communication component 216 is configured to facilitate wired or wireless communication between the apparatus 200 and other devices. The apparatus 200 may access a wireless network based on a communication standard, such as WiFi, 2G, or 3G, or a combination of them. In one exemplary embodiment, the communication component 216 receives broadcast signals or broadcast related information from an external broadcast management system via a broadcast channel. In one exemplary embodiment, the communication component 216 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 200 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components, for performing the methods described above.

In some embodiments, there is further provided a non-transitory computer-readable storage medium including instructions, for example, the memory 204 including instructions. The instructions may be executed by the processor 220 of the apparatus 200 to complete the foregoing method. For example, the non-transitory computer-readable storage medium may be a ROM, a random access memory (RAM), a CD-ROM, a magnetic tape, a floppy disk, an optical data storage device, etc.

The technical solution provided in the embodiments of the present disclosure may include the following beneficial effects: according to the method provided in the present disclosure, when a terminal transmits a plurality of pieces of information and the bandwidth required for the plurality of pieces of information for transmission is greater than the bandwidth corresponding to the terminal capability, the terminal determines the information for transmission, so as to avoid the problem of transmission errors caused by conflicts when transmitting information.

It can be further understood that "a plurality of" in the present disclosure means two or more, and other quantifiers are similar to it. "And/or" describes an association relationship of the associated objects, indicating that there can be three types of relationships. For example, A and/or B may indicate that: A exists alone, A and B exist at the same time, and B exists alone. The character "/" generally indicates that the associated objects before and after are in an "or" relationship. The singular forms "a", "said" and "the" are also intended to include the plural forms, unless the context clearly indicates other meanings.

It can be further understood that the terms "first", "second" and the like are used to describe various information, but these information should not be limited to these terms. These terms are only used to distinguish the same type of information from each other, and do not represent a specific order or importance. In fact, expressions such as "first" and "second" may be used interchangeably. For example, without departing from the scope of the present disclosure, the first information may also be referred to as the second information, similarly, the second information may also be referred to as the first information.

It can be further understood that although the operations are described in the drawings in a specific order, it should not be understood that the operations are performed according to the specific order shown or the serial order, or all of the illustrated operations are required to be performed to obtain a desired result. In particular environments, multitasking and parallel processing may be advantageous.

Other embodiments of the present disclosure will be apparent to those skilled in the art from consideration of the specification and practice of the present disclosure. The present disclosure is intended to cover any variations, uses, or adaptations of the present disclosure following the general principles of the present disclosure and including common general knowledge or conventional technical means in the art not disclosed in the present disclosure. The specification and examples are considered as exemplary only, with a true scope and spirit of the present disclosure being indicated by the following claims.

It should be understood that the present disclosure is not limited to the precise structure that has been described above and illustrated in the accompanying drawings, and that various modifications and changes may be made without departing from the scope of the present disclosure. The scope of the present disclosure is limited only by the appended claims.

What is claimed is:

1. A method for data transmission, performed by a reduced capability (Redcap) terminal, the method comprising:

determining that the Redcap terminal is configured with a first bandwidth greater than a transmission bandwidth corresponding to a terminal capability of the Redcap terminal, and transmitting a first quantity of information based on the first bandwidth; and determining, in response to a bandwidth required for the first quantity of information being greater than the transmission bandwidth corresponding to the terminal capability, to transmit a second quantity of information in the first quantity of information to a network device in a wireless communication system based on a predefined information priority, and taking the second quantity of information as information for transmission;

wherein the second quantity is less than the first quantity.

2. The method for data transmission according to claim 1, wherein the information for transmission comprises at least one of:

data and/or signaling for sending;

data and/or signaling for receiving;

data and/or signaling for measuring; or data and/or signaling for monitoring.

3. The method for data transmission according to claim 1, wherein the first quantity of information comprises a UE specific search space (USS) and a physical downlink shared channel (PDSCH) scheduled via a semi-static manner; and determining to transmit the second quantity of information in the first quantity of information to the network device in the wireless communication system based on the predefined information priority comprises:

determining, in response to an information priority of the PDSCH scheduled via the semi-static manner being higher than an information priority of the USS, to receive the PDSCH scheduled via the semi-static manner;

wherein the PDSCH scheduled via the semi-static manner is scheduling information preset for and associated with downlink control signaling.

4. The method for data transmission according to claim 1, wherein the first quantity of information comprises a USS and a PDSCH scheduled via a dynamic manner; and determining to transmit the second quantity of information in the first quantity of information to the network device in the wireless communication system based on the predefined information priority comprises:

determining, in response to an information priority of the PDSCH scheduled via the dynamic manner being higher than an information priority of the USS, to receive the PDSCH scheduled via the dynamic manner;

wherein the PDSCH scheduled via the dynamic manner is scheduling information dynamically indicated by a physical downlink control channel (PDCCH) corresponding to the received PDSCH.

5. The method for data transmission according to claim 1, wherein the first quantity of information comprises a UE specific search space (USS), and at least one of a PDSCH for carrying a random access response (RAR) or a PDCCH for scheduling an RAR PDSCH; and determining to transmit the second quantity of information in the first quantity of information to the network device in the wireless communication system based on the predefined information priority comprises:

determining, in response to an information priority of the at least one of the PDSCH for carrying the RAR or the PDCCH for scheduling the RAR PDSCH being higher than an information priority of the USS, to receive the PDSCH for carrying the RAR or monitor the PDCCH for scheduling the RAR PDSCH.

6. The method for data transmission according to claim 1, wherein the first quantity of information comprises a PDSCH scheduled via a semi-static manner and a PDSCH scheduled via a dynamic manner; and determining to transmit the second quantity of information in the first quantity of information to the network device in the wireless communication system based on the predefined information priority comprises:

determining, in response to an information priority of the PDSCH scheduled via the dynamic manner being higher than an information priority of the PDSCH scheduled via the semi-static manner, to receive the PDSCH scheduled via the dynamic manner.

7. The method for data transmission according to claim 1, wherein the first quantity of information comprises a PDSCH scheduled via a semi-static manner and at least one of a PDSCH for carrying an RAR or a PDCCH for scheduling an RAR PDSCH; and determining to transmit the second quantity of information in the first quantity of information to the network device in the wireless communication system based on the predefined information priority comprises:

determining, in response to an information priority of the at least one of the PDSCH for carrying the RAR or the PDCCH for scheduling the RAR PDSCH being higher than an information priority of the PDSCH scheduled via the semi-static manner, to receive the PDSCH for carrying the RAR or monitor the PDCCH for scheduling the RAR PDSCH.

8. The method for data transmission according to claim 1, wherein the first quantity of information comprises a PDSCH scheduled via a dynamic manner and at least one of a PDSCH for carrying an RAR or a PDCCH for scheduling an RAR PDSCH; and determining to transmit the second quantity of information in the first quantity of information to the network device in the wireless communication system based on the predefined information priority comprises:

determining, in response to an information priority of the at least one of the PDSCH for carrying the RAR or the PDCCH for scheduling the RAR PDSCH being higher than an information priority of the PDSCH scheduled via the dynamic manner, to receive the PDSCH for carrying the RAR or monitor the PDCCH for scheduling the RAR PDSCH.

9. The method for data transmission according to claim 1, wherein the first quantity of information comprises a physical uplink shared channel (PUSCH) scheduled via a semi-static manner and a PUSCH scheduled via a dynamic manner;

determining to transmit the second quantity of information in the first quantity of information to the network device in the wireless communication system based on the predefined information priority comprises:

determining, in response to an information priority of the PUSCH scheduled via dynamic manner being higher than an information priority of the PUSCH scheduled via semi-static manner, to transmit the PUSCH scheduled via dynamic manner;

wherein, the PUSCH scheduled via semi-static manner is scheduling information preset for downlink control signaling, and the PUSCH scheduled via the dynamic manner is scheduling information dynamically indicated by a physical uplink control channel (PUCCH) corresponding to the transmitted PUSCH.

10. The method for data transmission according to claim 1, wherein the first quantity of information comprises a PUSCH scheduled via a semi-static manner and a PUCCH for carrying an uplink scheduling request (SR);

determining to transmit the second quantity of information in the first quantity of information to the network device in the wireless communication system based on the predefined information priority comprises:

determining, in response to an information priority of the PUCCH for carrying the SR being higher than an information priority of the PUSCH scheduled via semi-static manner, to transmit the PUCCH for carrying the SR.

11. The method for data transmission according to claim 1, wherein the first quantity of information comprises a PUSCH scheduled via semi-static manner and a PUCCH for carrying a hybrid automatic repeat request (HARQ);

determining to transmit the second quantity of information in the first quantity of information to the network device in the wireless communication system based on the predefined information priority comprises:

determining, in response to an information priority of the PUCCH for carrying the HARQ being higher than an information priority of the PUSCH scheduled via semi-static manner, to transmit the PUCCH for carrying the HARQ.

12. The method for data transmission according to claim 1, wherein the first quantity of information comprises a PUSCH scheduled via semi- static manner and a physical random access channel (PRACH);

determining to transmit the second quantity of information in the first quantity of information to the network device in the wireless communication system based on the predefined information priority comprises:

determining, in response to an information priority of the PRACH being higher than an information priority of the PUSCH scheduled via semi-static manner, to transmit the PRACH.

13. The method for data transmission according to claim 1, wherein the first quantity of information comprises a PUSCH scheduled via a dynamic manner and a PUCCH for carrying an SR;

determining to transmit the second quantity of information in the first quantity of information to the network device in the wireless communication system based on the predefined information priority comprises:

determining, in response to an information priority of the PUCCH for carrying the SR being higher than an information priority of the PUSCH scheduled via the dynamic manner, to transmit the PUCCH for carrying the SR.

14. The method for data transmission according to claim 1, wherein the first quantity of information comprises a PUSCH scheduled via a dynamic manner and a PUCCH for carrying an HARQ;

determining to transmit the second quantity of information in the first quantity of information to the network device in the wireless communication system based on the predefined information priority comprises:

determining, in response to an information priority of the PUCCH for carrying the HARQ being higher than an information priority of the PUSCH scheduled via the dynamic manner, to transmit the PUCCH for carrying the HARQ.

15. The method for data transmission according to claim 1, wherein:

when the first quantity of information comprises a PUSCH scheduled via a dynamic manner and a PRACH, determining to transmit the second quantity of information in the first quantity of information to the network device in the wireless communication system based on the predefined information priority comprises: determining, in response to an information priority of the PRACH being higher than an information priority of the PUSCH scheduled via the dynamic manner, to transmit the PRACH;

when the first quantity of information comprises a PUCCH for carrying an SR and a PUCCH for carrying an HARQ, determining to transmit the second quantity of information in the first quantity of information based on a predefined information priority comprises: determining, in response to an information priority of the PUCCH for carrying the HARQ being higher than an information priority of the PUCCH for carrying the SR, to transmit the PUCCH for carrying the HARQ;

when the first quantity of information comprises a PUCCH for carrying an SR and a PRACH, determining to transmit the second quantity of information in the first quantity of information based on a predefined information priority comprises: determining, in response to an information priority of the PRACH being higher than an information priority of the PUCCH for carrying the SR, to transmit the PRACH for carrying; and when the first quantity of information comprises a PUCCH for carrying an HARQ and a PRACH, determining to transmit the second quantity of information in the first quantity of information based on a predefined information priority comprises:

determining, in response to an information priority of the PRACH being higher than an information priority of the PUCCH for carrying the HARQ, to transmit the PRACH for carrying.

16. A reduced capability (Redcap) terminal, comprising:

a processor; and a memory storing a processor-executable instruction;

wherein the processor is configured to:

determine that the Redcap terminal is configured with a first bandwidth greater than a transmission bandwidth corresponding to a terminal capability of the Redcap terminal, and transmit a first quantity of information based on the first bandwidth; and determine, in response to a bandwidth required for the first quantity of information being greater than the transmission bandwidth corresponding to the terminal capability, to transmit a second quantity of information in the first quantity of information to a network device in a wireless communication system based on a predefined information priority, and take the second quantity of information as information for transmission;

wherein the second quantity is less than the first quantity.

17. A method for data transmission, performed by a network device, comprising:

configuring a first bandwidth for a reduced capability (Redcap) terminal in a wireless communication system, wherein the first bandwidth is greater than a transmission bandwidth corresponding to a terminal capability of the Redcap terminal; and receiving with the first bandwidth a second quantity of information in a first quantity of information transmitted by the Redcap terminal based on a predefined information priority, wherein a bandwidth required for the first quantity of information is greater than the transmission bandwidth corresponding to the terminal capability, the first quantity of information is greater than the second quantity of information, and the second quantity of information is information with a high information priority in the first quantity of information.

18. An apparatus for data transmission, comprising:

a processor; and a memory storing a processor-executable instruction;

wherein the processor is configured to perform the method for data transmission according to claim 17.

* * * * *